(12) United States Patent
Franklin

(10) Patent No.: US 6,824,911 B2
(45) Date of Patent: Nov. 30, 2004

(54) INTEGRATED FUEL CELL POWER SYSTEM

(75) Inventor: Jerrold E. Franklin, Sacramento, CA (US)

(73) Assignee: Altergy Systems, Gold River, CA (US)

( * ) Notice: Subject to any disclaimer, the term of this patent is extended or adjusted under 35 U.S.C. 154(b) by 456 days.

(21) Appl. No.: 10/126,165

(22) Filed: Apr. 18, 2002

(65) Prior Publication Data

US 2003/0198846 A1 Oct. 23, 2003

(51) Int. Cl.[7] .............................................. H01M 2/14
(52) U.S. Cl. ............................ 429/38; 429/39; 429/34; 429/32; 429/25
(58) Field of Search .............................. 429/38, 39, 34, 429/32, 25

(56) References Cited

U.S. PATENT DOCUMENTS

| | | | |
|---|---|---|---|
| 6,268,077 B1 * | 7/2001 | Kelley et al. ................. | 429/33 |
| 6,447,945 B1 * | 9/2002 | Streckert et al. .............. | 429/34 |
| 6,492,055 B1 * | 12/2002 | Shimotori et al. ............ | 429/34 |
| 6,576,361 B1 * | 6/2003 | Barton ........................ | 429/25 |
| 6,627,339 B2 * | 9/2003 | Haltiner, Jr. ................. | 429/17 |
| 6,773,843 B2 * | 8/2004 | Kitagawa et al. ............. | 429/32 |

* cited by examiner

*Primary Examiner*—Bruce F. Bell
(74) *Attorney, Agent, or Firm*—Daniel Maguire

(57) ABSTRACT

The present invention is a fuel cell power system, with a fuel cell stack, a multi-function mounting plate, at least two fuel supply units, a distribution manifold, a gas pressure regulator, and a cover. The distribution manifold and gas pressure regulator may be integrated into the mounting plate. The mounting plate also serves as an end plate for the fuel cell stack. The system allows for continuous, uninterrupted use, since at least one fuel supply unit is removable, and the system can operate from another supply unit while the removable unit is being replaced.

21 Claims, 5 Drawing Sheets

INTEGRATED FUEL CELL POWER SYSTEM

FIELD OF THE INVENTION

The present invention relates to fuel cell power systems.

BACKGROUND

Fuel cell power systems include a number of components, including the fuel cell stack, the fuel supply, a pressure regulator to control the flow of the fuel supply, and various tubes and fittings which serve as manifolds for distribution of fuel through the system. Fuel cells typically use hydrogen gas as a fuel but other fuels such as methyl alcohol (methanol) or reformed hydrocarbons (reformate) may be used.

Fuel cell power systems are typically manufactured by acquiring the various components as stand-alone products, and then assembling them into a fuel cell system. In other words, typical fuel cell systems are not created as integrated systems, but rather are pieced together from stand-alone components.

As a result of this piecemeal assembly, previous fuel cell systems have required an inordinate number of parts, particularly for the various components that distribute gases throughout the system. With so many components, the cost of assembling fuel cell systems has been unnecessarily high. By integrating the system, the component count could be lowered, and the assembly cost reduced.

SUMMARY OF THE INVENTION

The present invention is an integrated fuel cell system, comprised of a fuel cell stack or stacks, an integrated, multi-function mounting plate, fuel supply unit(s), a distribution manifold, a gas pressure regulator, and a cover. By integrating components, the present invention helps improve fuel cell operation, and lowers component count and assembly costs.

DETAILED DESCRIPTION

Figure 1:
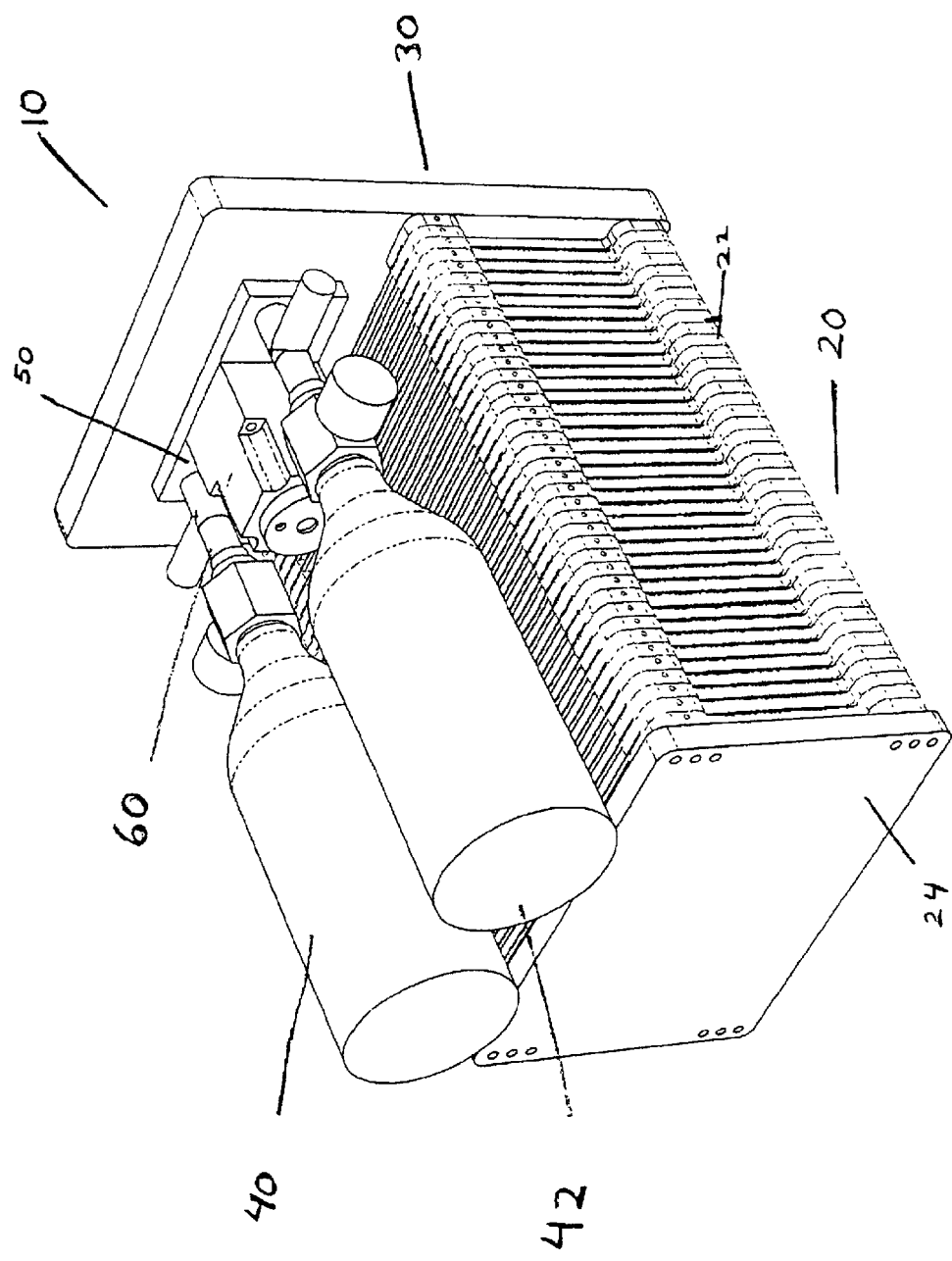
FIG. 1 is a perspective view of a fuel cell system according to the present invention, without a cover.

The present invention is an integrated fuel cell power system 10, comprised of a fuel cell stack 20, an integrated, multi-function mounting plate 30, fuel supply unit(s) 40, 42, a distribution manifold 50, a gas pressure regulator 60, and a cover 70.

As shown in FIG. 1, the fuel cell stack 20 is comprised of an array of individual fuel cells 22, and an end plate 24. The mounting plate 30 functions as a fuel cell end plate. The integrated system of the present invention can work with virtually any polymer electrolyte membrane (PEM) fuel cell stack, including but not limited to stacks comprised of integrated fuel cells, or more conventional stacks comprised of fuel cells assembled from separate stand-alone components. The present invention can work with systems that use ambient or pressurized air as an oxidizer, either in natural convection mode or forced air mode.

Figure 4:
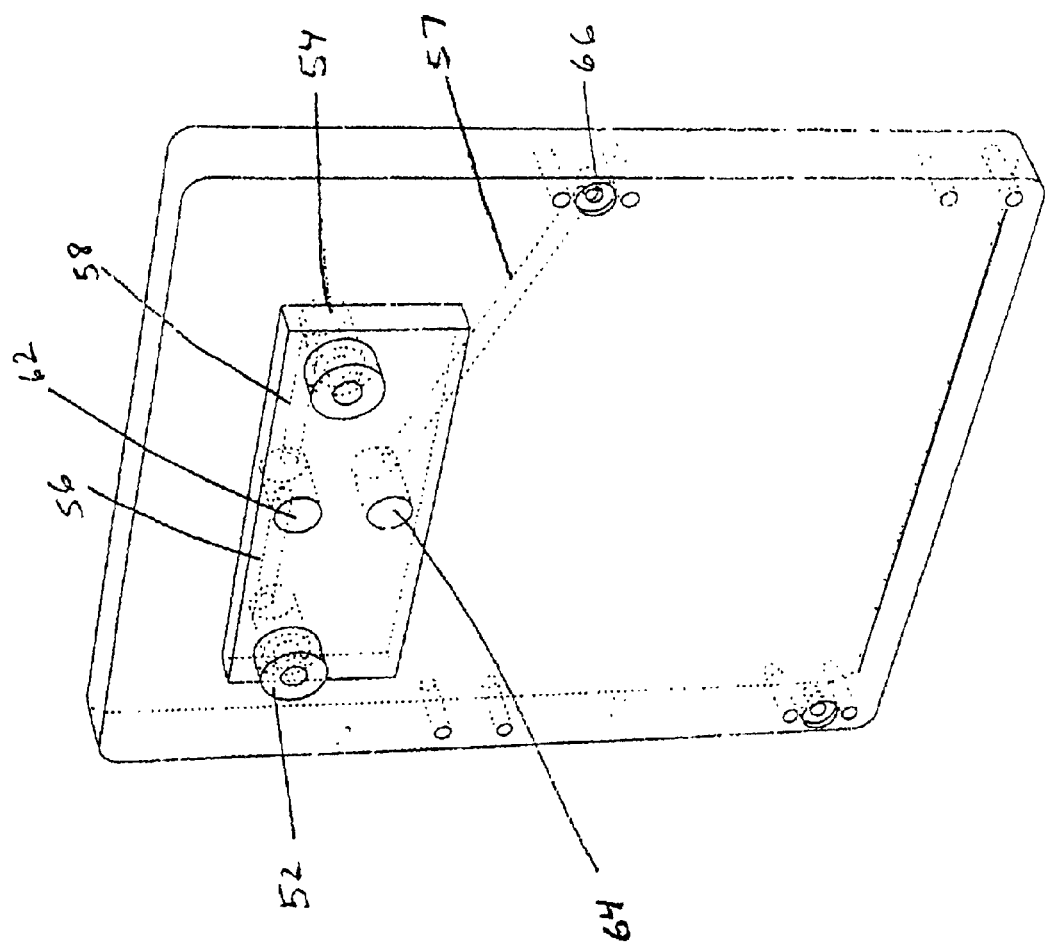
FIG. 4 is a perspective view of a mounting plate according to the present invention, showing the internal gas distribution plumbing.

As shown in FIGS. 1 & 4, the mounting plate 30 serves two functions. First, the plate serves as an end plate for the fuel cell stack.

Second, integrated within or attached to the mounting plate is a fuel distribution manifold 50, and a gas pressure regulator 60. The manifold receives fuel from the fuel supply units 40, 42. From the manifold, the fuel passes through the regulator 60 and into the stack 20. The distribution manifold contains valves 52, 54 for receiving fuel from the fuel supply units 40, 42. These valves engage complementary valve 44 attached to the fuel supply unit(s). Both manifold valves 52, 54 and the fuel supply unit valve 44 are self-sealing, so that when the fuel supply units are removed from the manifold the valves close, ensuring that no gas will escape.

The manifold 50 distributes high pressure gas to the pressure regulator 60, FIG. 1, through internal passages 56, 58 and regulator inlet port 62 shown in FIG. 4.

The pressure regulator 60 reduces the pressure of the fuel gas so that is suitable for use by the fuel cell stack. Regulators of a suitable type can be supplied commercially from different vendors, for example: Air-Logic, 5102 Douglass Avenue, Racine, Wis. The regulated fuel is then conveyed out of the pressure regulator to the fuel cell stack 20 by passing from the pressure regulator through the regulated gas pressure port 64 of the distribution manifold 50 and then through internal passage 57 and into the fuel cell stack by way of the fuel cell inlet port 66. The regulated gas can also be transmitted to the stack 20 from the regulator 60 through external piping hoses or tubes. The output pressure of the regulator is adjusted or set by means of a set screw, knob, dial, or other output control means. The pressure regulator can but need not be integrated with the mounting plate.

The mounting plate can be expanded to accommodate more than one set of manifolds and pressure regulators, so that more than one set of fuel cell stacks can be used with a single plate.

Figure 3A:
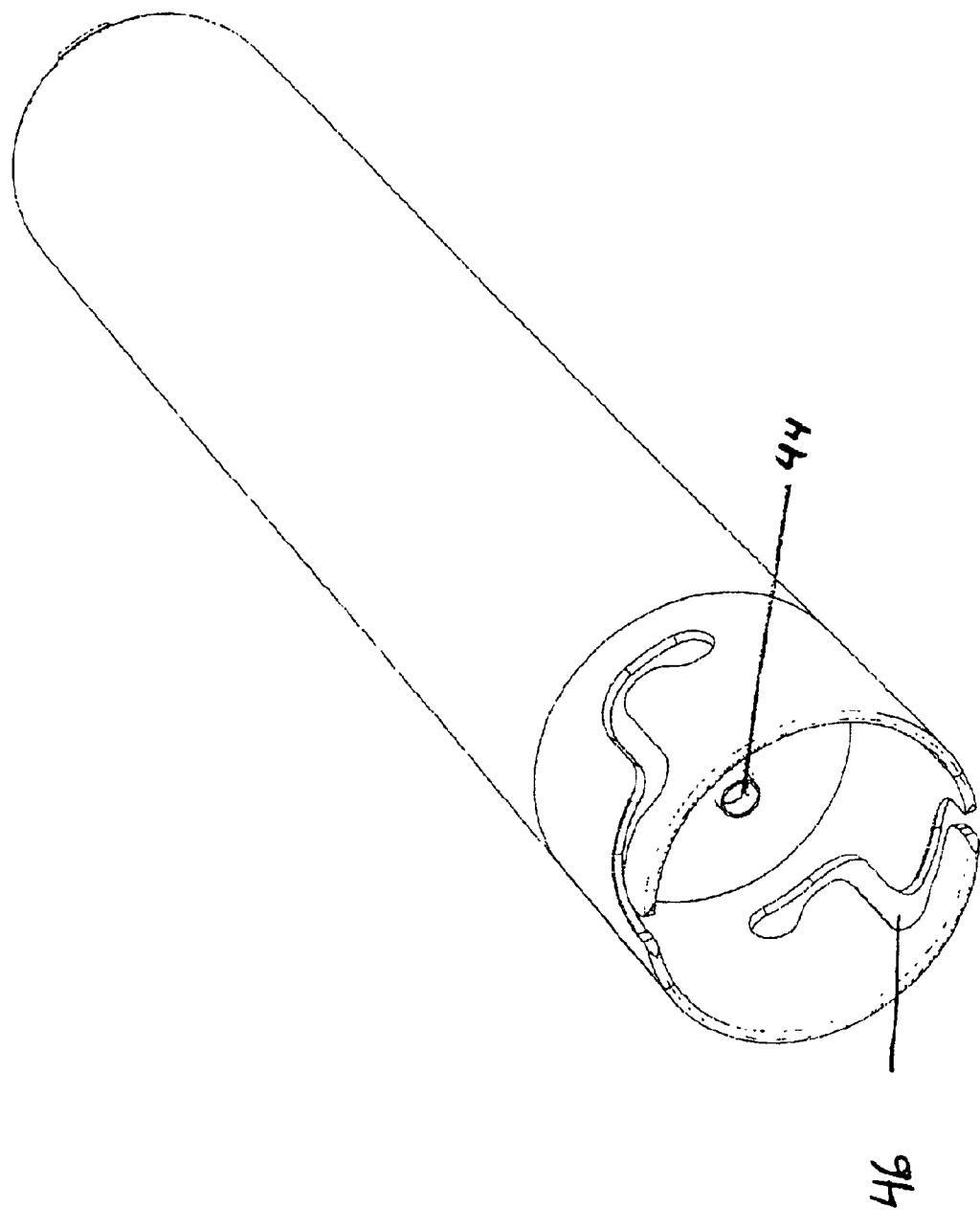
FIG. 3a is a perspective view of a fuel supply unit with a bayonet mount.
Figure 3B:
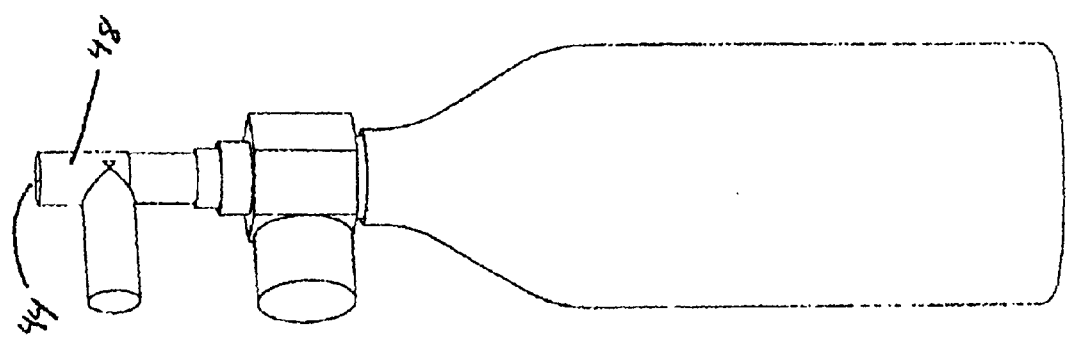
FIG. 3b is a perspective view of another fuel supply unit with a spring-loaded mount.

The fuel supply units can take many forms. As shown in FIGS. 1, 3a, and 3b, they can be in the form of conventional pressurized gas storage bottles or methanol tanks. Additionally, metal hydride fuel cartridges can be used, such as the "Hydrogen Storage System, Model Number ST-1-AL" supplied by ERGENICS, INC., 247 Margaret King Ave, Ringwood, N.J. Fuel can also be supplied from an external source such as large pressurized hydrogen gas bottles or other standard methods of supplying hydrogen such as reformers. The units can connect to the distribution manifold through a bayonet-type connection 46, as shown in FIG. 3, or through other conventional methods known to those skilled in the mechanical arts, including but not limited to a screw thread, or spring-loaded attachments 48. (FIG. 3b).

The system of the present invention can be operated continuously, meaning that replacement fuel sources can be removed and reinstalled while the system is operating, resulting in uninterrupted use. In one embodiment of the present invention, both fuel supply units are removable fuel units, and a single spent fuel unit can be removed and replaced while the system operates off the other one. In an alternative embodiment, one fuel supply unit or cartridge is permanent and the other is removable. The system can run off the permanent supply while the removable supply is replaced with a fresh cartridge or other supply unit. The permanent supply can then be refilled from fuel in the removable unit. The permanent supply can take the form of a pressurized gas bottle, a hydride cartridge, bladder, or other suitable container. Even those with little or no technical experience should have little trouble replacing cartridges or other supply units within the present invention.

The fuel supply units are recharged or refilled using standard methods used in the industry. The valve 44 opens automatically when connected to a charging or filling unit and when charged or refilled and removed from the charging or filling unit they then self seal and are ready for immediate use.

Figure 2:
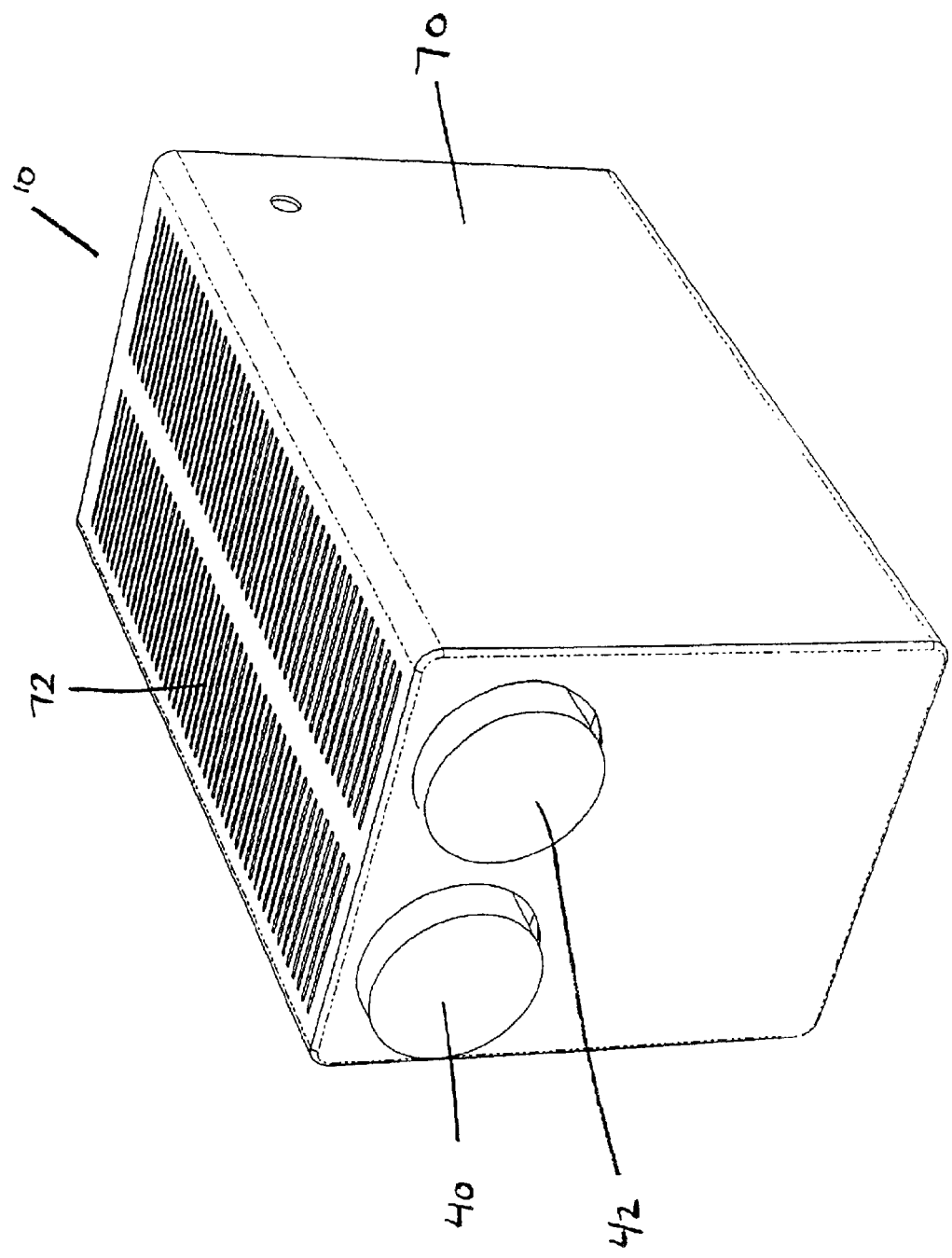
FIG. 2 is a perspective view of a fuel cell system according to the present invention, with a cover.

As shown in FIG. 2, the cover 70 encloses the fuel cell system, but allows for easy access to the fuel supply units 40, 42. The fuel supply units 40, 42 can be removed without removing the cover 70. The cover has slots 72 or louvers to facilitate proper air circulation.

One skilled in the art will appreciate that the present invention can be practiced by other than the described embodiments, which are presented for purposes of illustration and not limitation. Various modifications and changes can be made to the fuel supply units, valves, pressure regulators, mounting plate and the like without departing to the scope of the present invention.

I claim:

1. An integrated fuel cell power system, comprising:
    a stack of fuel cells;
    a mounting plate serving as an end plate for said fuel cells, said mounting plate comprising:
        a plate; and
        a fuel distribution manifold for receiving fuel and distributing fuel, said manifold integrated with said plate;
    a gas pressure regulator connected to said fuel distribution manifold; and
    a fuel supply unit with means to removably connect to said fuel distribution manifold.

2. The fuel cell power system according to claim 1, additionally comprising a second fuel supply unit.

3. The fuel cell power system according to claim 2, wherein said both fuel supply unit and said second fuel supply unit are removable from said system.

4. The fuel cell power system according to claim 2, wherein said fuel supply unit is permanent within said system, and said second fuel supply unit is removable from said system.

5. The fuel cell power system according to claim 4, wherein said fuel supply unit is refilled from said second fuel supply unit.

6. The fuel cell power system according to claim 1, wherein said fuel supply unit connects to said fuel distribution manifold through a valve, and wherein said valve automatically shuts when said fuel supply unit is removed from said distribution manifold.

7. The fuel cell power system according to claim 6, wherein said means to removably connect fuel supply unit to said fuel distribution manifold is a second valve, and wherein said second valve automatically seals when said fuel supply unit is removed from said second valve.

8. The fuel cell power system according to claim 1, wherein said fuel cell stack uses oxygen from ambient air as an oxidizer.

9. The fuel cell power system according to claim 8, wherein natural convection is used to circulate said ambient air.

10. The fuel cell power system according to claim 8, wherein forced convection is used to circulate said ambient air.

11. The fuel cell power system according to claim 1, additionally comprising a second fuel distribution manifold integrated with said plate.

12. The fuel cell power system according to claim 11, additionally comprising a second gas pressure regulator connected to said second fuel distribution manifold.

13. The fuel cell power system according to claim 1, additionally comprising a cover fully enclosing said stack of fuel cells and said mounting plate, and partially enclosing said fuel supply unit.

14. The fuel cell power system according to claim 13, wherein said cover has openings for passage of convective air currents.

15. The fuel cell system according to claim 1, wherein said gas pressure regulator is integrated with said plate.

16. The fuel cell power system of claim 1, wherein said fuel cell stack uses hydrogen as a fuel.

17. The fuel cell power system of claim 1, wherein said fuel cell stack uses methanol as a fuel.

18. The fuel cell power system of claim 1, wherein said fuel cell stack uses reformate as a fuel.

19. The fuel cell power system of claim 1, wherein said fuel supply unit is a pressurized gas bottle.

20. A fuel cell mounting plate, comprising
    a plate;
    a fuel distribution manifold for receiving and distributing fuel, said manifold integrated with said plate; and
    a gas pressure regulator connected to said fuel distribution manifold.

21. A fuel cell power system, comprising:
    a stack of fuel cells;
    a mounting plate serving as an end plate for said fuel cells, said mounting plate comprising:
        a plate; and
        a fuel distribution manifold for receiving and distributing fuel, said manifold attached to said plate;
    a gas pressure regulator connected to said fuel distribution manifold; and
    a fuel supply unit with means to removably connect to said fuel distribution manifold.

* * * * *